(12) United States Patent
Guha et al.

(10) Patent No.: US 6,804,798 B2
(45) Date of Patent: Oct. 12, 2004

(54) SYSTEM AND METHOD FOR SETTING NEW VALUES FOR CONFIGURATION PARAMETERS ON A DEVICE

(75) Inventors: Biswaroop Guha, Roseville, CA (US); Jim Branen, Citrus Heights, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 600 days.

(21) Appl. No.: 09/822,714

(22) Filed: Mar. 30, 2001

(65) Prior Publication Data

US 2002/0144194 A1 Oct. 3, 2002

(51) Int. Cl.[7] ............................................. G06F 11/00
(52) U.S. Cl. ................................................... 714/49
(58) Field of Search ................... 714/15, 19, 27, 714/40, 44, 49, 54

(56) References Cited

U.S. PATENT DOCUMENTS

| | | | | |
|---|---|---|---|---|
| 5,465,328 A | * | 11/1995 | Dievendorff et al. ......... | 714/15 |
| 6,009,500 A | * | 12/1999 | Rossi ......................... | 711/162 |
| 6,341,373 B1 | * | 1/2002 | Shaw ......................... | 717/173 |
| 6,467,088 B1 | * | 10/2002 | alSafadi et al. ............. | 717/173 |
| 6,502,174 B1 | * | 12/2002 | Beardsley et al. .......... | 711/170 |
| 6,601,212 B1 | * | 7/2003 | Guha et al. ................. | 714/776 |
| 6,615,404 B1 | * | 9/2003 | Garfunkel et al. .......... | 717/173 |
| 6,640,334 B1 | * | 10/2003 | Rasmussen ................. | 717/171 |

* cited by examiner

Primary Examiner—Robert Beausoliel
Assistant Examiner—Bryce P. Bonzo

(57) ABSTRACT

A method for setting new values for configuration parameters on a device having cache memory and permanent memory, and using a transaction manager having a plurality of error checks selectively designated to respective configuration parameters, including the steps of providing a new value for a configuration parameter, determining an error check designated to each configuration parameter provided with the new value, performing the an error check determined for each the configuration parameter, setting the new value for the configuration parameter in the cache memory of the device, determining whether the new value is being committed to the device, and saving the new value from the cache memory to the permanent memory when the new value is being committed to the device.

16 Claims, 3 Drawing Sheets

SYSTEM AND METHOD FOR SETTING NEW VALUES FOR CONFIGURATION PARAMETERS ON A DEVICE

The present invention generally relates to an improved method and system for setting new values for configuration parameters on a device. More specifically, it relates to an improved method and system for setting new values for configuration parameters on a device having cache memory and permanent memory, and using a transaction manager and a plurality of error checks designated to the configuration parameters.

BACKGROUND OF THE INVENTIVE ART

An overall architectural view of the implementation for a prior method is shown in FIG. 1. Conventionally, in order to modify the configuration parameters, for example, a Transmission Control Protocol ("TCP") 10 of a computing or peripheral device, different methods are generally required, depending on the gateway protocol used. As used herein, configuration parameters are instructions or instruction sets that are utilized in carrying out the operation of a specific protocol. For example, when a telnet protocol 12 is used as a gateway to modify a configuration parameter of an IP address for the TCP parameters 10, a telnet configuration method 14 with its own error checking system is used. On the other hand, when a Simple Network Management Protocol ("SNMP") 16 is used as a gateway to modify the same IP address, a different configuration method 18 along with its own error check system is used. In both instances, although the same configuration parameter is being modified, two different methods and error checks are executed.

Similarly, as shown in FIG. 1, the Hyper Text Transport Protocol ("HTTP") 20, the Trivial File Transfer Protocol ("TFTP") 22, the Transport Internet Protocol ("XIP") 24, and the File Transfer Protocol ("FTP") 26 require four separate configuration methods 28, 30, 32, 34 respectively, each having its own error checks and logic to handle the TCP configuration parameters. Even when two gateway protocols, such as the Bootstrap Protocol ("BOOTP") 36 and the Dynamic Host Configuration Protocol ("DHCP") 38, use the same configuration method 40, there are still numerous different error checks and logic being used by the other protocols. To further complicate the system, different methods are used for each configuration parameter within the same gateway protocol. So, with the use of the many different gateway protocols along with their various methods, the error checks, logic, and codes for each configuration parameter become very cumbersome and difficult to handle.

The problem with the prior method is that as a result of using various methods with their own error validation systems, it is hard to keep the synchronization of all the different error-handling codes with each of the protocols. Furthermore, each method has its own interface to access and modify the parameters, creating inconsistent logic during the configuration session. Because of inconsistencies in the use of different error-handling codes and logic for the various methods, network management and troubleshooting of these configuration parameters are unnecessarily complicated.

Yet another problem is that each of the methods implements its own caching mechanism to temporarily buffer the user-specified data. Although the user-specified data is eventually moved from the cache memory into the permanent memory, the multiple caching by the various methods causes unnecessary duplication of codes. In addition, the codes are more complex and hard to handle as a result. Furthermore, it may result in a race condition when two separate methods are trying to save the same parameter simultaneously.

BRIEF SUMMARY OF THE INVENTION

The present invention is directed to an improved method and system for setting new values for configuration parameters on a device. More specifically, it relates to an improved method and system for setting new values for configuration parameters on a device having cache memory and permanent memory, and using a transaction manager having a plurality of error checks selectively designated to the configuration parameters.

The present invention provides a method that includes the steps of providing at least one new value for one or more configuration parameters, determining an error check designated to each configuration parameter provided with a new value, performing the error check(s) determined for each of the configuration parameters, setting the new value(s) for the configuration parameter(s) in cache memory of the device, determining whether the new value(s) is/are being committed to the device, and saving the new value(s) from the cache memory to the permanent memory when the new value(s) is/are being committed to the device.

The present invention also provides a system that includes a transaction manager module for creating a unified session of configuring new values for the configuration parameters on the device, a list of error checks designated to the configuration parameters on the device, a cache memory for storing the new values of the configuration parameters during the unified session, and a permanent memory for saving the new values of the configuration parameters once the new values are committed to the device.

GLOSSARY OF TERMS AND ACRONYMS

Figure 1:
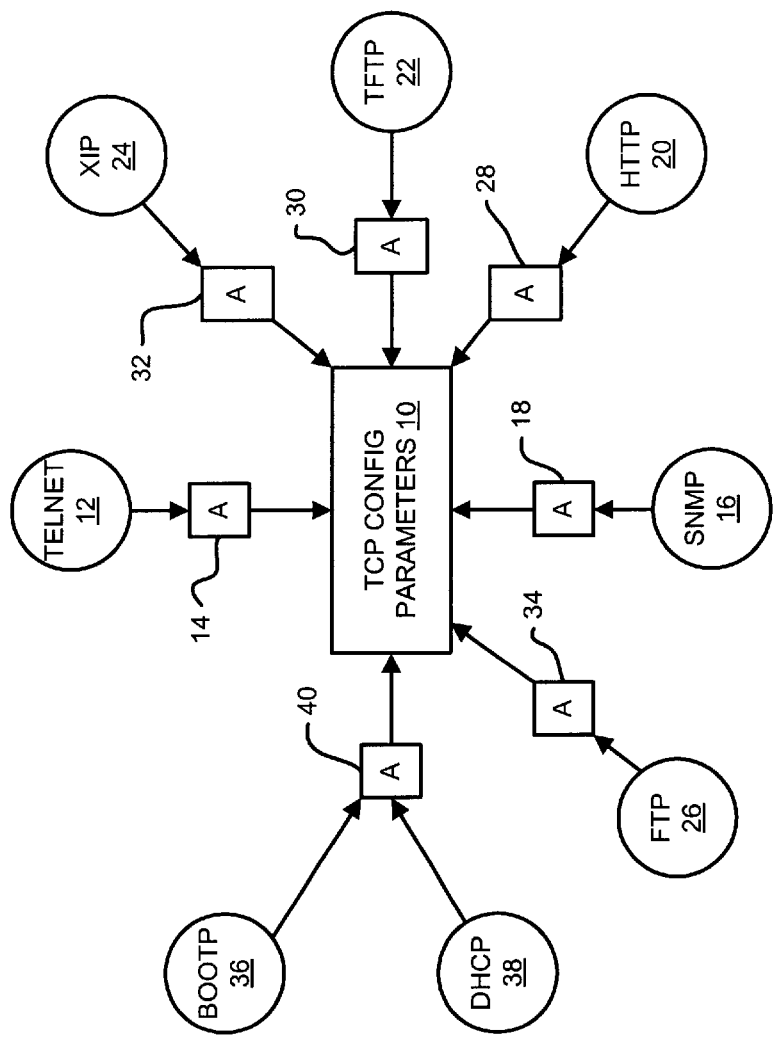
FIG. 1 is an architectural diagram of a prior art implementation of various gateway protocols.

The following terms and acronyms are used throughout the detailed description:

Bootstrap Protocol ("BOOTP"). A protocol described in Request for Comments ("RFCs") 951 and 1084 and used for booting diskless workstations.

Cache memory. A temporary memory that holds recently accessed data.

Configuration Parameters. Configuration parameters are instructions or instruction sets that are utilized in carrying out the operation of a specific protocol.

Dynamic Host Configuration Protocol ("DHCP"). A protocol that provides a means to dynamically allocate IP addresses to computers on a Local Area Network ("LAN"), which is defined in the RFC 2131. The system administrator assigns a range of IP addresses to the DHCP, and each client computer on the LAN has its TCP/IP software configured to request an IP address from the DHCP server upon logging onto the network.

File Transfer Protocol ("FTP"). A client-server protocol that allows a user on one computer to transfer files to and from another computer over a TCP/IP network. The FTP is defined in STD 9, RFC 959.

Hyper Text Transport Protocol ("HTTP"). The standard World Wide Web client-server protocol used for the exchange of information (such as HTML documents, and client requests for such documents) between a browser and a Web server. HTTP includes a number of different types of requests, which can be sent from the client to the server to request different types of server actions. For example, a "GET" request, which has the format GET <URL>, causes the server to return the document or file located at the specified URL.

Internet Protocol ("IP"). A network layer, defined in STD 5, RFC 791, for the TCP/IP protocol, which is widely used on Ethernet networks. IP is a connectionless, best-effort packet switching protocol. It provides packet routing, fragmentation and re-assembly through the data link layer.

Request For Comments ("RFC"). A series, which begun in 1969, of Internet informational documents and standards that are widely followed by commercial software and freeware in the computer communities.

Simple Network Management Protocol ("SNMP"). An Internet standard protocol, defined in STD 15, RFC 1157, developed to manage nodes on an IP network.

STD. A subseries of Request For Comments ("RFC") that specify Internet standards.

Telnet. The Internet standard protocol for remote login that runs on top of TCP/IP.

Transmission Control Protocol over Internet Protocol ("TCP"). A transport layer protocol, developed by Defense Advanced Research Projects Agency ("DARPA"), used generally on Ethernet and the Internet. TCP is built on top of Internet Protocol (IP), and, as a result, it is sometimes referred to as TCP/IP (TCP over IP). TCP, defined in STD 7, RFC 793, provides full-duplex, process-to-process connections.

Transmission Control Protocol over Internet Protocol ("TCP/IP"). The Ethernet Protocols developed by DARPA for internetworking and encompasses both network layer and transport layer protocols.

Transport Internet Protocol ("XIP"). A mechanism by which a peripheral interacts with a print server device using the peripheral back-plane.

Trivial File Transfer Protocol ("TFTP"). A simple file transfer protocol defined in RFC 1350, which is generally used for down-loading boot code to diskless workstations.

DETAILED DESCRIPTION

Broadly stated, the present invention is directed to an improved method and system for setting new values for configuration parameters on a device. The method and system provides a transaction manager that unifies the configuration methods of the gateway protocols. All the configuration methods are required to follow the same interface to access data, and the transaction manager further ensures that the same error checks for each configuration parameter will be used. Since all the parameter-specified information is maintained in one single location, additions and modifications to the configuration parameters is simplified. Also, because the transaction manager provides caching of the parameters for all the methods, the need for local buffering of data by the various gateway protocols is eliminated, creating a more consistent and efficient use of codes and cache memory. It should be understood that the use of "a" also refers to "one or more" for better readability. Any references of configuration parameter, error check and new value should herein be read as to mean one or more.

Figure 2:
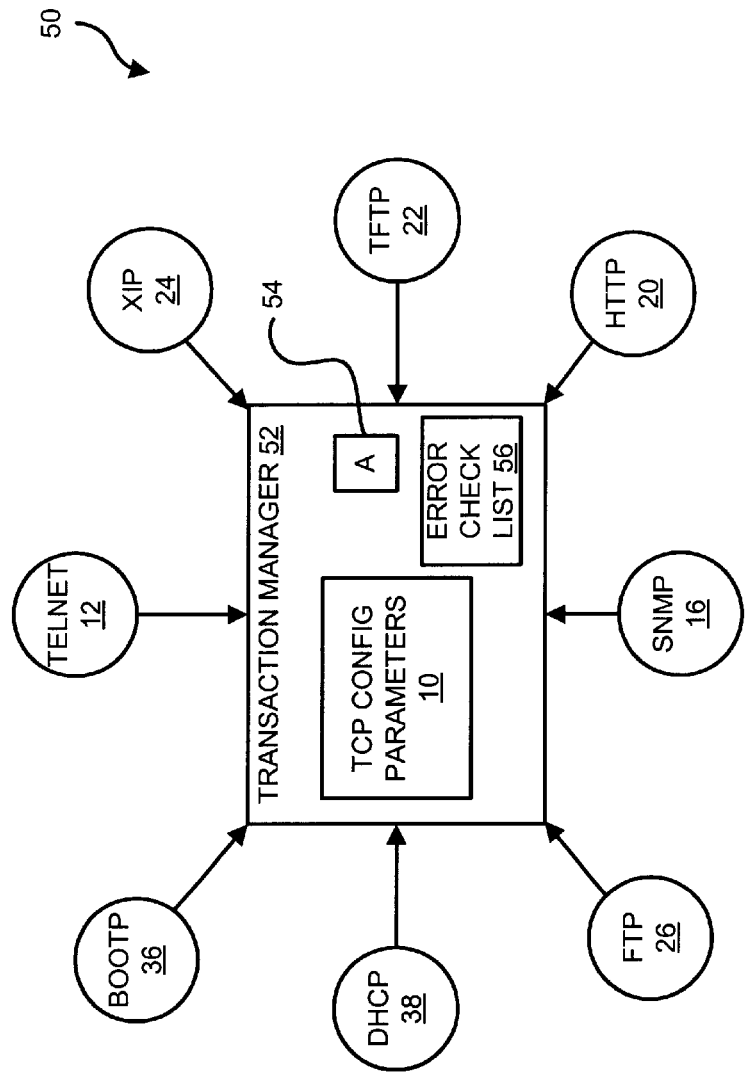
FIG. 2 is an architectural diagram of an implementation using the present invention with various gateway protocols; and, FIG. 3 is a flow chart illustrating the preferred functionality of a configuration method of the present invention.

An architectural diagram of an implementation using the present invention with various protocols is shown in FIG. 2, and indicated generally at 50. In order to maintain consistency with the previous example given, the configuration parameters of a TCP 10 will also be used in FIG. 2. Consequently, the same protocols that were linked to the TCP 10 in the FIG. 1 are also included, specifically the telnet 12, the XIP 24, the TFTP 22, the HTTP 20, the SNMP 16, the FTP 26, the DHCP 38, and the BOOTP 36. However, because the system is unified by a transaction manager 52, only one configuration method 54 is needed. In the present invention, the transaction manager 52 also includes a list of the error checks 56. For each configuration parameter, one or more designated error check will be executed.

The transaction manager 52 is initiated whenever a modification of the configuration parameters is requested by any of the gateway protocols. For example, instead of having Telnet executing its own configuration method and its own error checks, the transaction manager executes the single unified configuration method 54. Also, the designated error checks for each of the configuration parameters are the same regardless of the gateway protocols used. As a result, the system is less complicated, and fewer codes-handlings must be addressed by the device.

It should be noted that a general device will be referred in order to capture that the present invention can be implemented on a computing device or a peripheral device. In the case of the peripheral device, the present invention is preferably implemented as firmware. On the other hand, for the computing device, the present invention is preferably implemented as software. It should be appreciated herein that a device refers to a computing device as well as a peripheral device.

Figure 3:
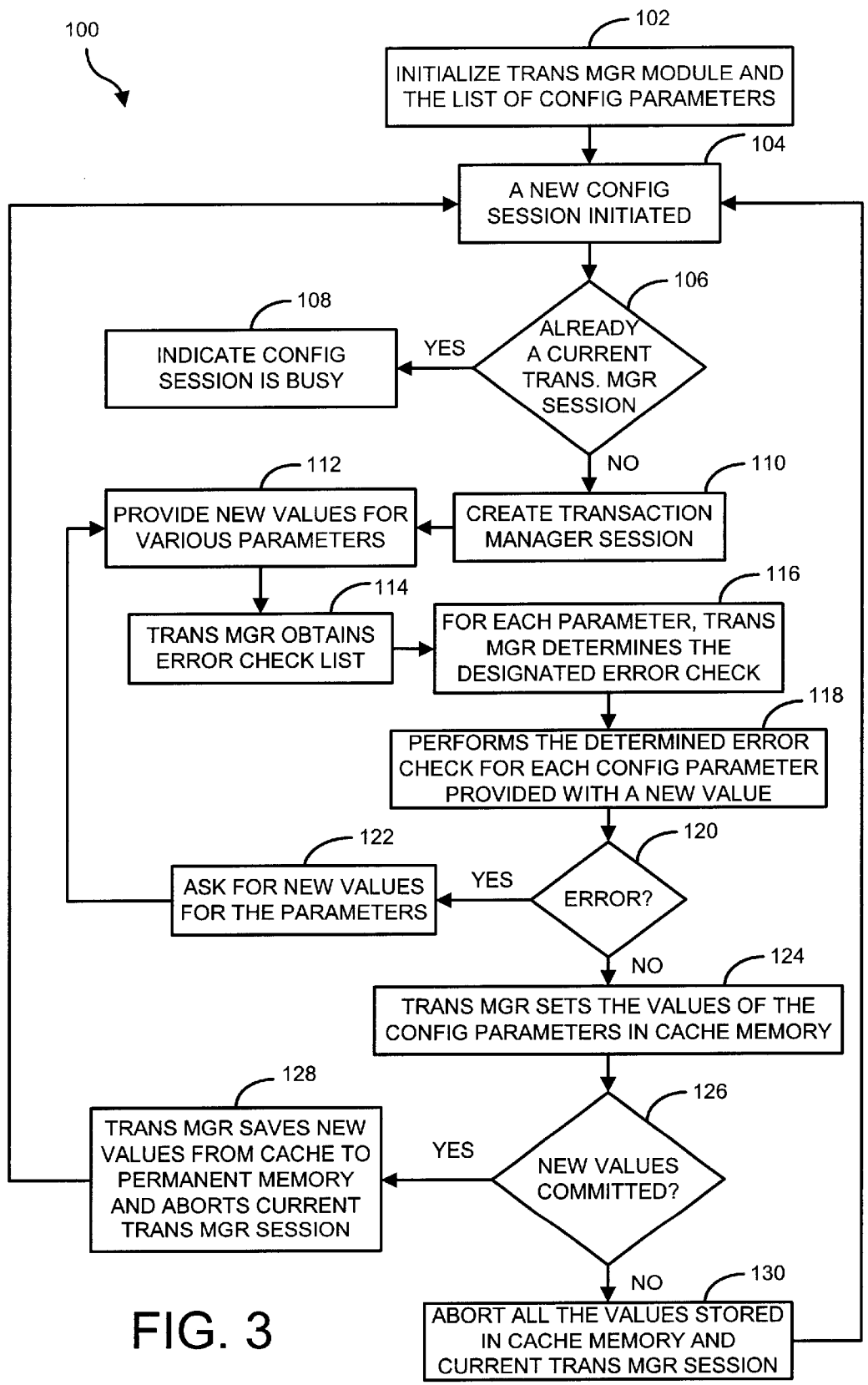

Turning to an important aspect of the preferred embodiment of the present invention, a flow chart of the preferred functionality of a configuration method is shown in FIG. 3, and indicated generally at 100. The transaction manager module and the list of the configuration parameters are initialized by the device at the start of the system (Block 102), which sits idle until a new configuration session is initiated by one of the gateway protocols (Block 104). Generally, new configuration sessions are initiated by users. However, it is contemplated that the present invention can work with other modules that initialized the session instead of the user, which may require other steps depending on the module. Therefore, it should be understood that these other methods are within the scope of the present invention.

Since a new configuration session being initiated (Block 104), it is next determined whether there is a current transaction manager session running (Block 106). If there is already transaction manager session running (Block 106), it will be indicated that the configuration session is currently busy (Block 108). Depending on the gateway protocol used to initiate the configuration session, each gateway protocol may respond to the busy message differently. Some of the gateway protocols respond by returning an error message to the user, and some remain idle if a configuration session is unavailable. However, it is important to indicate that the configuration session is busy. By doing so, conflicting configuration sessions will be avoided. Otherwise, the two protocols will be allowed to run two separate configuration sessions simultaneously, with each session using a different method, which can result in unnecessary confusion, complexity and potential race condition. When there are multiple new configuration session requests, a first in first out order is preferred.

However, when it is determined that there is not a transaction manager session currently running (Block 106), a new transaction manager session is then created (Block 110). The user or module provides a set of new values for various parameters (Block 112). In response to the new values provided (Block 112), the transaction manager obtains a list of the error checks designated to the configuration parameters (Block 114), and determines the error check(s) needed for each configuration parameter that has been provided with a new value (Block 116). The list contains various error checks, and each configuration parameter is designated with one or more error checks from the list.

The determined error checks are then preformed for each configuration parameter provided with the new value(s) (Block 118). Next, it is determined whether any of the error checks found an error (Block 120). If an error is found (Block 120), the transaction manager will prompt for a set of new values to be entered for the configuration parameters (Block 122). At that time, the process idles until new values are provided for various parameters by a user or a module (Block 112). However, if no error is found (Block 120), the transaction manager sets the new values of the configuration parameters in cache memory (Block 124). It is next determined whether these new values of the configuration parameters are ready to be committed to the device (Block 126). If so, the transaction manager saves these new values from the cache memory to permanent memory (Block 128), and the current transaction manager session will accordingly be aborted (Block 128). The process, in turn, idles until a new configuration session is initiated again (Block 104). If, on the other hand, a user decided that these new values should not be committed to the device (Block 126), the transaction manager session will abort the new values of the configuration parameters stored in the cache memory (Block 130), and again the current transaction manager session is also aborted at this time (Block 130). The process will sit in idle until a new configuration session is initiated by a gateway protocol (Block 104).

From the foregoing description, it should be understood that an improved method and system for setting new values for configuration parameters on a device has been shown and described, which has many desirable attributes and advantages. The method and system provide a way to unify the various configuration methods from using different gateway protocols with the use of a transaction manager. All the configuration methods are required to follow the same interface to access data, and the same error checking is used for each configuration parameter. Also, since all the parameter-specified information is maintained in one single location, additions and modifications to the configuration parameters are simplified. Because the transaction manager provides caching of the parameters for all the methods, the need for local buffering of data by the various protocols is eliminated, creating a more consistent and efficient use of codes and cache memory.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for setting new values for configuration parameters on a device having cache memory and permanent memory, said configuration parameters comprising instructions for carrying out the operation of specific ones of multiple protocols, each specific protocol having an associated error check, said new values being set using a transaction manager having a plurality of said error checks, said method comprising the steps of:

providing a new value for configuration parameters of at least one of said multiple protocols;

determining said associated error check for said specific protocol for each configuration parameter of said specific protocol that is provided with said new value;

performing said error check determined for each configuration parameter;

setting said new value for said configuration parameter in the cache memory of the device;

determining whether said new value is being committed to the device; and, saving said new value from the cache memory to the permanent memory when said new value is being committed to the device.

2. The method according to claim 1 further comprising the step of aborting said new value stored in the cache memory when said new value is not committed to the device.

3. The method according to claim 1 wherein prior to the step of providing a new value further comprises the steps of:

initializing the transaction manager module; and, initializing a list of configuration parameters available on the device.

4. The method according to claim 1 wherein prior to the step of providing a new value further comprises the steps of:

initiating a new configuration session; and, creating a transaction manager session responsive to said step of initiating a new configuration session.

5. The method according to claim 4 further comprises aborting said transaction manager session after said creating step.

6. The method according to claim 1 wherein prior to the step of providing a new value further comprises the steps of:

initiating a new configuration session;

determining whether there is a current transaction manager session;

indicating that configuration session is busy when there is a current transaction manager session; and, creating a transaction manager session when there is not a current transaction manager session.

7. The method according to claim 6 further comprises aborting said transaction manager session after said creating step.

8. The method according to claim 1 wherein prior to the step of determining an error check further comprises the step of obtaining a list of error checks designated to the configuration parameters on the device.

9. The method according to claim 1 wherein prior to the step of setting said at least one new value further comprises the steps of:

determining whether said determined error checks found an error; and, asking for at least one new value for at least one configuration parameter when said determined error checks found an error.

10. The method according to claim 1 wherein said step of determining whether said new value is being committed to the device further comprises the step of aborting said new value stored in the cache memory when said new value is not committed to the device.

11. A system for setting new values for configuration parameters available on a device having cache memory and permanent memory, said configuration parameters comprising instructions for carrying out the operation of specific ones of multiple protocols, each specific protocol having an associated error check, said new values being set using a transaction manager having a plurality of error checks designated to the configuration parameters, comprising:

- means for providing a new value for configuration parameters of at least one of said multiple protocols;
- means for determining said associated error check for said specific protocol for each configuration parameter of said specific protocol that is provided with said new value;
- means for performing said error check determined for each configuration parameter;
- means for setting said new value for said configuration parameter in the cache memory of the device;
- means for determining whether said new value is being committed to the device; and,
- means for saving said new value from the cache memory to the permanent memory when said new value is being committed to the device.

12. A system for setting new values for configuration parameters on a device having cache memory and permanent memory, said configuration parameters comprising instructions for carrying out the operation of specific ones of multiple protocols, each specific protocol having an associated error check, said system comprising:

- a transaction manager module for creating a unified session of setting new values of the configuration parameters for at least selective protocols that are available on the device;
- a plurality of error checks selectively designated by configuration parameters available on the device;
- a cache memory for storing the new values of the configuration parameters for said selective protocols during the unified session; and,
- a permanent memory for saving the new values of the configuration parameters for said selective protocols once the new values are committed to the device.

13. The system as defined in claim 12 wherein said transaction manager module obtains a list of error checks designated to each configuration parameter available in the device responsive to input of a new value.

14. The system as defined in claim 13 wherein said transaction manager module determines the error check designated to the configuration parameter provided with a new value, and performs said error check for each configuration parameter.

15. A computer program product comprising a computer usable medium having computer readable program codes embodied in the medium that when executed causes a computer to:

- provide a new value for a configuration parameter of the type which comprise instructions for carrying out the operation of specific ones of multiple protocols, each specific protocol having an associated error check;
- determine said associated error check for each configuration parameter for said specific protocols that are provided with said new value;
- perform said error check determined for each configuration parameter;
- set said new value for said configuration parameter in the cache memory of the device;
- determine whether said new value is being committed to the device; and,
- save said new value from the cache memory to the permanent memory when said new value is being committed to the device.

16. A device program product comprising a peripheral device usable medium having device readable program codes embodied in the medium that when executed causes a peripheral device to:

- provide a new value for a configuration parameter of the type which comprise instructions for carrying out the operation of specific ones of multiple protocols, each specific protocol having an associated error check;
- determine said associated error check for each configuration parameter for said specific protocols that are provided with said new value;
- perform said error check determined for each configuration parameter;
- set said new value for said configuration parameter in the cache memory of the device;
- determine whether said new value is being committed to the device; and,
- save said new value from the cache memory to the permanent memory when said new value is being committed to the device.

* * * * *